United States Patent [19]

Schultz et al.

[11] Patent Number: 4,804,071

[45] Date of Patent: Feb. 14, 1989

[54] CARBON BRAKE DISC GROOVES PREVENTING CYCLOIDAL VIBRATION

[75] Inventors: Max L. Schultz, Niles, Mich.; Raymond J. Black, South Bend, Ind.

[73] Assignee: Allied-Signal Inc., Morristown, N.J.

[21] Appl. No.: 181,781

[22] Filed: Apr. 15, 1988

[51] Int. Cl.[4] ............ F16D 55/36; F16D 13/00; F16D 65/10

[52] U.S. Cl. ............ 188/71.5; 188/218 X L; 192/70.14

[58] Field of Search ............ 188/18 A, 71.5, 71.7, 188/71.8, 73.37, 218 X L; 192/70.14, 85 AA; 244/110 A

[56] References Cited

U.S. PATENT DOCUMENTS

| | | | |
|---|---|---|---|
| 2,987,143 | 6/1961 | Culbertson et al. | 188/72 |
| 3,357,519 | 12/1967 | Anderson et al. | 188/18 |
| 3,368,653 | 2/1968 | Vander Veen | 188/218 R |
| 4,013,147 | 3/1977 | Anderson | 188/218 X L |
| 4,286,694 | 9/1981 | Wiseman, Jr. et al. | 188/71.5 |
| 4,585,096 | 4/1986 | Bok | 188/71.5 X |

Primary Examiner—Andres Kashnikow
Assistant Examiner—Robert J. Oberleitner
Attorney, Agent, or Firm—Larry J. Palguta; Ken C. Decker

[57] ABSTRACT

Carbon brake discs (14, 16) of an aircraft brake (10) include in opposing radial surfaces thereof circumferentially extending annular grooves (44, 46). Each annular groove (44, 46) may be disposed oppositely from an annular groove (44, 46) in the other radial surface of the respective disc (14, 16). Each annular groove (44, 46) extends radially from a respective adjacent axial edge (34, 36) of an adjacent disc (14, 16) and toward a peripheral area of the disc (14, 16) which is connected operatively with either a non-rotating axle (11) or a wheel supported rotatably on the axle (11). The annular grooves (44, 46) alter the contact pressure distribution between the discs (14, 16) and eliminate a portion of the disc (14, 16) wear surface which does not have continual contact with the mating wear surface of the adjacent disc (14, 16) and thereby minimize unstable rotor cycloidal motion.

4 Claims, 2 Drawing Sheets

CARBON BRAKE DISC GROOVES PREVENTING CYCLOIDAL VIBRATION

The present invention relates to vehicle brakes, and in particular aircraft carbon brake discs.

Aircraft brakes typically include a plurality of stator discs and rotor discs which are compressed together in order to effect braking of the aircraft. The rotor and stator discs may comprise carbon brake discs which have substantial advantages relating to thermal properties and wear. However, as each of the rotor and stator discs wear during brake usage, a distinct wear pattern develops and unstable rotor cycloidal vibration often occurs. The rotor cycloidal vibration is induced by the wear pattern which develops on each radial surface of the discs. The wear contours developed by rotor and stator discs produce the unstable rotor cycloidal vibration which is highly damaging to rotor drive inserts used to key the rotor discs to the wheel. The present invention provides a solution to the problem of undesirable rotor cycloidal vibration by providing circumferentially extending annular grooves in radial surfaces of the rotor and stator discs in order to prevent the development of wear contours which produce the unstable rotor cycloidal vibration. The present invention comprises a multi-disc brake having rotor discs and stator discs positioned between an axle and a wheel rotatably supported on the axle, the stator discs connected operatively at radially inner peripheries to the axle and the rotor discs interleaved between the stator discs and connected operatively at radially outer peripheries to the wheel, means carried by the brake for compressing the interleaved discs, certain ones of the stator discs having adjacent the inner periphery thereof an annular stator groove disposed in each radial surface of the respective stator disc, each of the annular stator grooves commencing substantially contiguous with an adjacent radially inner axial edge of an adjacent rotor disc and extending radially inwardly a predetermined distance within the respective radial surface of the stator disc, and each of said rotor discs having adjacent the outer periphery thereof an annular rotor groove disposed in each radial surface of the respective rotor disc, each of the annular rotor grooves commencing contiguous with an adjacent radially outer axial edge of an adjacent stator disc and extending radially outwardly a predetermined distance within the respective radial surface of the rotor disc, the annular rotor and stator grooves within the discs effecting the minimization of unstable rotor cycloidal motion.

One way of carrying out the invention is described in detail below with reference to the drawings which illustrate an embodiment in which.

Figure 1:
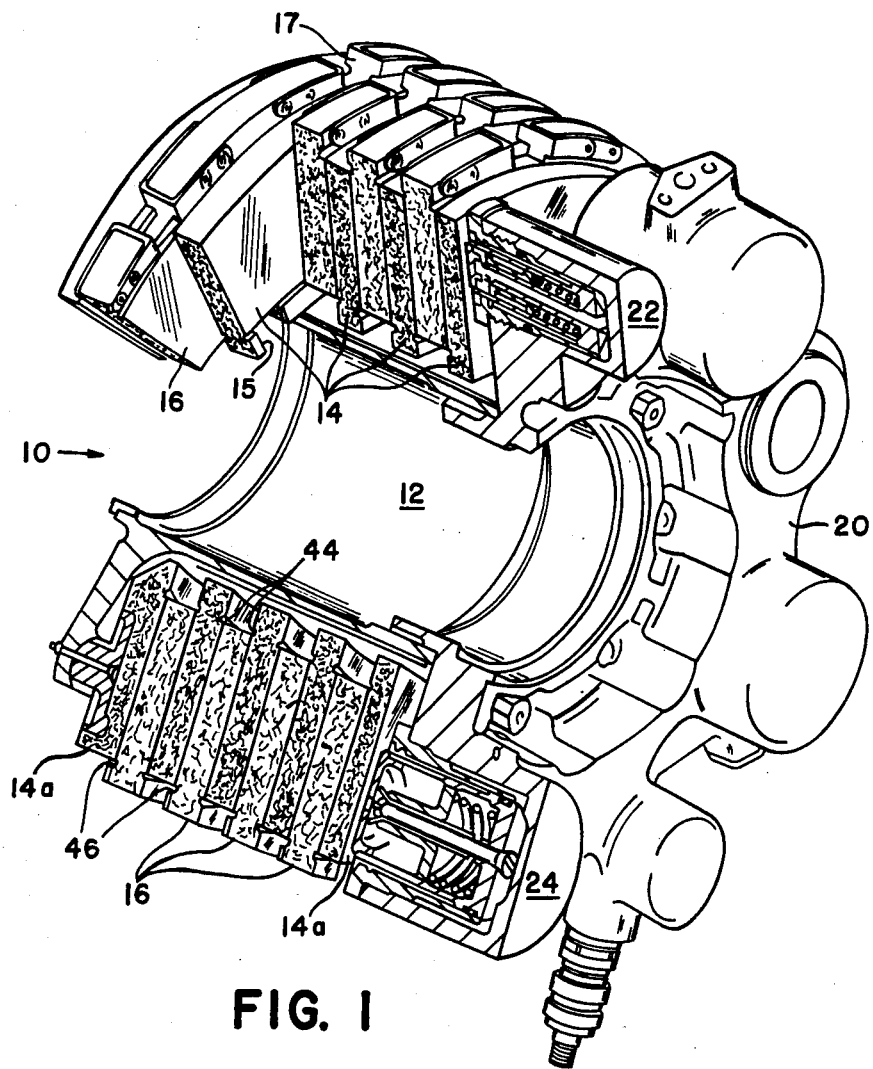
FIG. 1 is a isometric section view of an aircraft brake utilizing therein the present invention.

FIG. 1 illustrates an aircraft brake referenced generally by numeral 10. Brake 10 includes a torque tube 12 attached non-rotatively to an axle (not shown) extending therethrough, and with stator discs 14 each attached non-rotatively (not shown) to torque tube 12 in a well known manner. Interleaved between stator discs 14 are a plurality of correspondingly shaped rotor discs 16 which are each attached, in a well known manner, at radially outer peripheries to a wheel (not shown) disposed concentrically about torque tube 12. Brake 10 includes a housing 20 which houses a plurality of pressure piston devices 22 for compressing the stack of discs 14 and 16, and a plurality of brake adjustors 24 for effecting an adjusted initial position of the discs as they experience wear.

Figure 2:
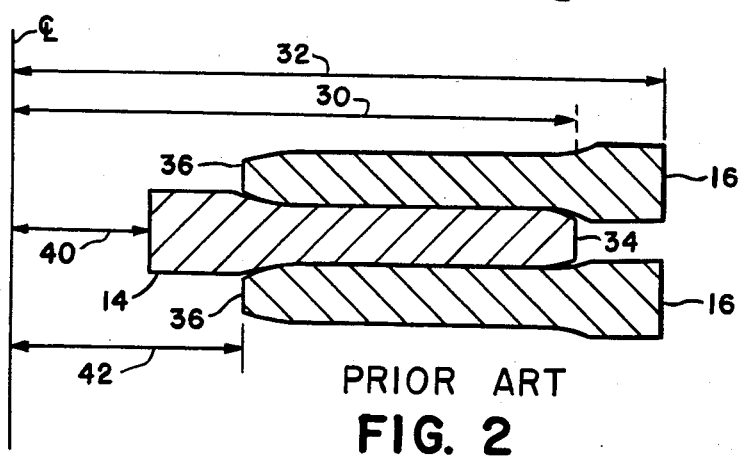
FIG. 2 is a schematic illustration of undesirable wear contours developed by previous rotor and stator discs.
Figure 3:
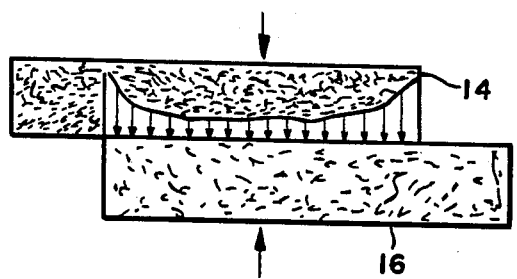
FIG. 3 is a schematic illustration of the initial pressure distribution effected on new rotor and stator discs.

FIG. 2 illustrates in schematic representation a set of prior adjacent stator and rotor discs 14, 16. Each of the discs has experienced wear during the usage of the aircraft brake in which the discs are situated and have developed the illustrated wear contours. Because the outer diameter 30 (measured from the centerline of the wheel and brake) of stator disc 14 on a carbon brake is smaller than the outer diameter 32 of the adjacent rotor disc 16, and similarly the inner diameter 40 of stator disc 14 is smaller than the inner diameter 42 of adjacent rotor disc 16, the brake discs do not wear evenly as a function of radial distance. The brake develops typically the wear contours shown in FIG. 2. The primary reason that the rotor and stator discs wear as shown in FIG. 2 is that the initial pressure distribution on new, flat rotor and stator discs is as shown in FIG. 3. In addition, because the rotor and stator discs have different centers, the axial edge of each radial wear surface does not contact the adjacent mating radial wear surface for the full 360° of rotation. As a result of the contact pressure distribution, the radially outer axial edges 34 (see FIG. 2) of stator discs 14 and the radially inner axial edges 36 of rotor discs 16 wear rapidly when the brake is in a relatively new condition. The initial wear reduces the high edge contact stresses so that, eventually, a stable uniform wear rate is achieved and the corresponding wear surface shapes or contours, as illustrated in FIG. 2, are achieved. The wear contours illustrated in FIG. 2 can result in unstable rotor cycloidal vibration which is highly damaging to the rotor drive inserts that key the rotor discs to the rotatably mounted wheel.

Figure 4:
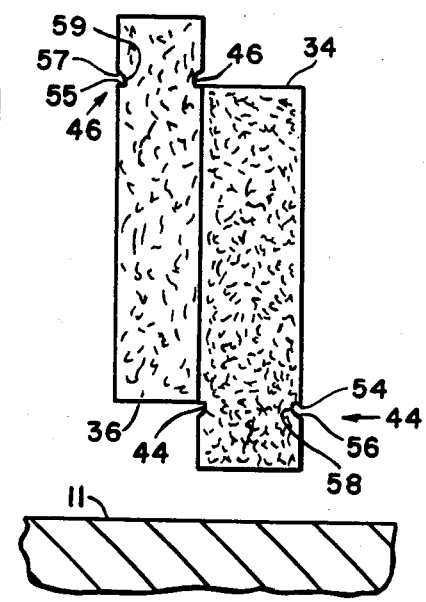
FIG. 4 is a schematic illustration of rotor and stator discs, utilizing the present invention.

The present invention comprises the positioning of circumferentially extending annular grooves within radial surfaces of the rotor and stator discs in order to prevent the development of wear contours of the type illustrated in FIG. 2. The annular grooves illustrated in FIG. 4 alter the contact pressure distribution and eliminate a portion of the radial wear surface of each disc which does not have continual contact with the adjacent mating wear surface, and thus prevent unstable rotor cycloidal motion. The oppositely disposed annular grooves 44 disposed within the radial surfaces of stator disc 14 are substantially identical to the oppositely disposed annular grooves 46 within opposing radial surfaces of adjacent rotor disc 16. Each annular groove commences at a radial distance substantially contiguous and orthogonally with the adjacent axially extending edge of the adjacent disc. In FIG. 4, the lefthand annular groove 44 of stator disc 14 commences at a radial position substantially contiguous with radially inner axial edge 36 of rotor disc 16, and extends radially inwardly relative to axle 11. Correspondingly, the annular grooves 46 commence within the respective radial surfaces of rotor disc 16 at a point substantially contiguous with adjacent axial edge 34 of adjacent stator disc 14, and extend radially outwardly relative to axle 11. The depth of each annular groove 44, 46 is determined by the maximum amount of wear of the rotor and stator discs. The groove width is determined by the initial rotor and stator disc diametral distances and by the amount of relative radial movement of the discs during use in aircraft brake 10. The annular grooves 44, 46 include respective facing axial surfaces 54, 55 that are substantially contiguous with the adjacent axial edge, opposing facing axial surfaces 56, 57, and respective bottom surfaces 58, 59. The bottom surfaces 58, 59 form with respective facing axial surfaces 56, 57 continuous curved surfaces. As can be seen in FIG. 1, the axially inner and outer stators 14a need but one annular groove in the rotor facing side of the respective stator. The grooves 44, 46 may not be continuous due to the positioning of stator slots 15 and rotor slots 17 for appropriate attachment to the torque tube 12 and wheel.

Figure 5:
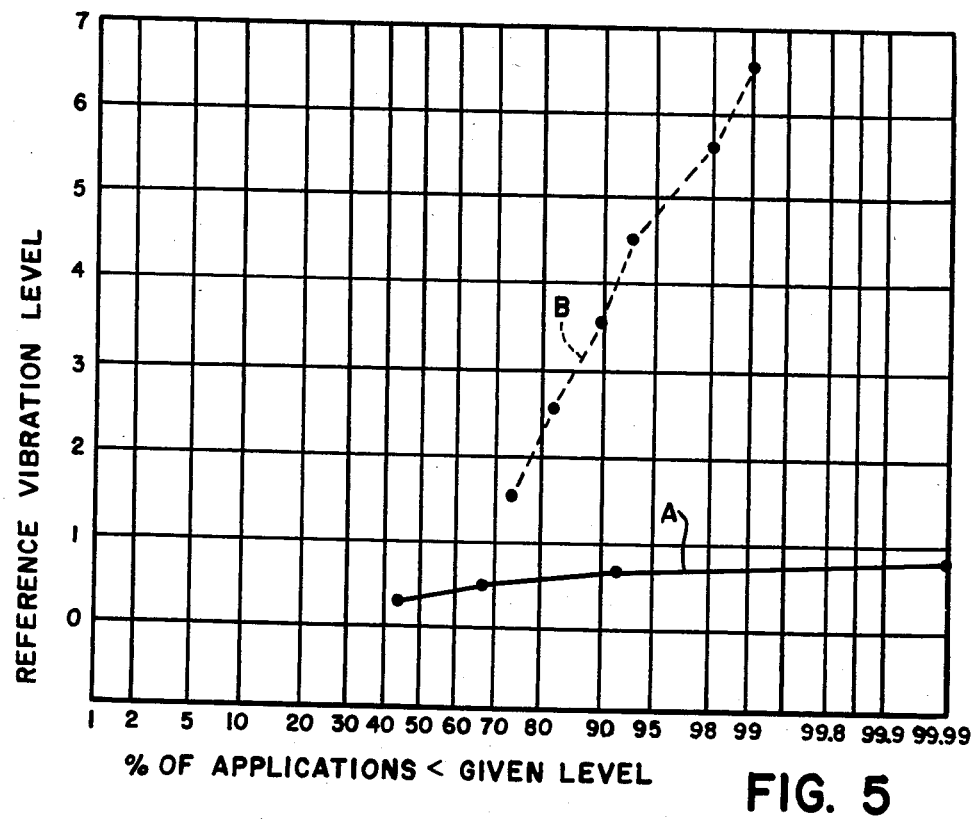
FIG. 5 is a graphic representation of test results.

Laboratory dynamometer tests of a complete wheel and brake system have shown the efficiency of the discreet positioning of circumferentially extending annular grooves within radial surfaces of adjacent rotor and stator discs of an aircraft brake. The results are illustrated in FIG. 5 wherein the minimized acceleration levels of cycloidal vibration by grooved discs is shown by Curve A and the acceleration vibration levels of discs without grooves is shown by Curve B.

Other provisions of the invention or variations will become apparent to those skilled in the art and will suggest themselves from the specific applications of the invention. It is intended that such variations and revisions of the invention, are as are to be expected on the part of those skilled in the art, to suit individual design preference and which incorporate the herein disclosed principles, will be included within the scope of the following claims as equivalents thereof.

We claim:

1. In a multi-disc brake having rotor discs and stator discs positioned between an axle and a wheel rotatably supported on the axle, the stator discs connected operatively at radially inner peripheries to the axle and the rotor discs interleaved between the stator discs and connected operatively at radially outer peripheries to the wheel, means carried by the brake for compressing the interleaved discs, certain ones of the stator discs having adjacent the inner periphery thereof an annular stator groove disposed in each radial surface of the respective stator disc, each of the annular stator grooves commencing substantially contiguous with an adjacent radially inner axial edge of an adjacent rotor disc and extending radially inwardly a predetermined distance within the respective radial surface of the stator disc, and each of said rotor discs having adjacent the outer periphery thereof an annular rotor groove disposed in each radial surface of the respective rotor disc, each of the annular rotor grooves commencing substantially contiguous with an adjacent radially outer axial edge of an adjacent stator disc and extending radially outwardly a predetermined distance within the respective radial surface of the rotor disc, the annular rotor and stator grooves within the discs effecting the minimization of unstable rotor cycloidal motion.

2. The multi-disc brake in accordance with claim 1, wherein the grooves within the rotor discs are disposed opposite from one another within respective radial surfaces of the rotor disc.

3. The multi-disc brake in accordance with claim 2, wherein each groove comprises oppositely facing axial surfaces connected by a bottom surface, one facing axial surface disposed adjacent the associated axial edge being disposed substantially orthogonally relative to the radial surface in which the groove extends.

4. The multi-disc brake in accordance with claim 3, wherein the other facing axial surface and bottom surface comprise a continuous curved surface which intersects with an axially innermost point of the one facing axial surface.

* * * * *